United States Patent [19]
Puig et al.

[11] 3,988,269
[45] Oct. 26, 1976

[54] HIGH LOAD-BEARING, HIGH STRENGTH POLYURETHANE FOAM

[75] Inventors: John E. Puig, Wallingford; John S. Babiec, Jr., Orange, both of Conn.

[73] Assignee: Olin Corporation, New Haven, Conn.

[22] Filed: Apr. 7, 1975

[21] Appl. No.: 565,491

[52] U.S. Cl. .................. 260/2.5 AT; 260/77.5 AT
[51] Int. Cl.² .................. C08G 18/14; C08G 18/76
[58] Field of Search ............. 260/2.5 AT, 453 AR, 260/453 AM

[56] References Cited
UNITED STATES PATENTS

| | | | |
|---|---|---|---|
| 3,341,463 | 9/1967 | Gemeinhardt | 260/2.5 AT |
| 3,467,606 | 9/1969 | Rice | 260/2.5 AP |
| 3,471,417 | 10/1969 | Dickert | 260/2.5 AT |
| 3,878,235 | 4/1975 | Schnabel et al. | 260/2.5 AT |

*Primary Examiner*—H.S. Cockeram
*Attorney, Agent, or Firm*—James B. Haglind; Donald F. Clements; Thomas P. O'Day

[57] ABSTRACT

Selected chlorine-containing methylene bridged diaryl diisocyanates are used in the production of high load-bearing, high strength polyurethane foam.

17 Claims, No Drawings

HIGH LOAD-BEARING, HIGH STRENGTH POLYURETHANE FOAM

This invention relates to the preparation of flexible polyurethane foam. More particularly, the invention relates to an improvement in the preparation of high load-bearing high-strength polyurethane foam.

It is known to prepare high load-bearing, high strength polyurethane foam from a reaction mixture including an organic polymeric isocyanate and toluene diisocyanate by employing a cross-linking curing agent. See, for example, U.S. Pat. No. 3,880,780 issued Apr. 29, 1975 to W. L. Ridenour et al. Aromatic amines such as 4,4'-methylene bis(2-chloroaniline) have been widely employed commercially as cross-linking agents. In addition to increasing the cost of the foam produced, several of these amine cross-linking agents are suspect as carcinogens and can therefore only be used under severely restricted operating conditions.

Also known in the preparation of high load-bearing, high strength flexible polyurethane foams is the use of polymer polyols containing a dispersion of a vinyl polymer such as polyvinyl chloride, polyacrylonitrile or polystyrene or a copolymer such as poly (styrene co-acrylonitrile). These polyols are reacted with a mixture of organic diisocyanates and organic polymeric isocyanates, to produce foam products having relatively high costs and reduced elongation properties.

It is, therefore, desirable to provide a process for preparing flexible polyurethane foams having high load-bearing and high strength properties which does not require the use of a cross-linking agent or a polymeric polyol, a process which can be operated at reduced cost.

Now it has been found, according to the present invention, that high load-bearing, high strength flexible polyurethane foams can be prepared by employing certain foam-forming mixtures comprised of organic polymeric isocyanates, select polyether polyols and chlorine-containing methylene-bridged diaryl diisocyanates.

The chlorine-containing methylene-bridged diaryl diisocyanates are represented by formula I as follows:

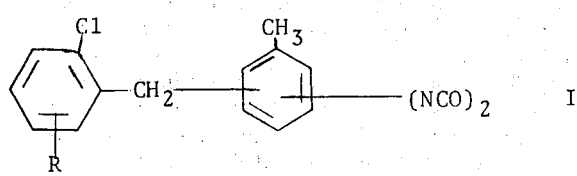

wherein R is hydrogen or chlorine.

Illustrative of the chlorine-containing methylene-bridged diaryl diisocyanates in formula I where R is hydrogen are the following monochlorophenyl diisocyanate compounds and mixtures thereof:

2-chlorophenyl-3'-methyl-4',6'-diisocyanatophenyl-methane
2-chlorophenyl-2'-methyl-3',5'-diisocyanatophenyl-methane
2-chlorophenyl-3'-methyl-2',4'-diisocyanatophenyl-methane
2-chlorophenyl-4'-methyl-3',5'-diisocyanatophenyl-methane Examples of chlorine-containing methylene-bridged diaryl diisocyanates of formula I where R is Cl include the following dichlorophenyl diisocyanates:

2,4-dichlorophenyl-3'-methyl-4',6'-diisocyanatophenyl-methane
2,4-dichlorophenyl-2'-methyl-3',5'-diisocyanatophenyl-methane
2,5-dichlorophenyl-2'-methyl-3',5'-diisocyanatophenyl-methane
2,4-dichlorophenyl-3'-methyl-2',4'-diisocyanatophenyl-methane
2,5-dichlorophenyl-3'-methyl-2',4'-diisocyanatophenyl-methane
2,4-dichlorophenyl-4'-methyl-3',5'-diisocyanatophenyl-methane
2,5-dichlorophenyl-4'-methyl-3',5'-diisocyanatophenyl-methane
2,5-dichlorophenyl-3'-methyl-4',6'-diisocyanatophenyl-methane
2,3-dichlorophenyl-3'-methyl-4',6'-diisocyanatophenyl-methane Preferred dichlorophenyl diisocyanates used in the process of the present invention are:

2,4-dichlorophenyl-3'-methyl-4',6'-diisocyanatophenyl-methane
2,4-dichlororphenyl-4'-methyl-3',5'-diisocyanatophenyl-methane
2,5-dichlorophenyl-3'-methyl-4',6'-diisocyanatophenyl-methane
2,3-dichlorophenyl-3'-methyl-4',6'-diisocyanatophenyl-methane and mixtures thereof.

Most preferred of the chlorine-containing methylene-bridged diaryl diisocyanates are monochlorophenyl diisocyanates of formula I wherein R is H.

The chlorine-containing methylene-bridged diaryl diisocyanates employed in the process of the present invention are liquids of low volatility and surprisingly low viscosity. In addition, by virtue of their low toxicity, they can be readily used to advantage in the preparation of polyurethane foams.

The chlorine-containing methylene-bridged diaryl diisocyanates employed in the process of the present invention can be prepared by condensing, in the presence of a Friedel-Crafts catalyst, toluene diisocyanate with the appropriate chlorine-substituted benzyl chloride. Thus, the 2-chlorophenyl methyldiisocyanatophenyl methane is obtained by condensing toluene diisocyanate with o-chlorobenzyl chloride in accordance with the following equation:

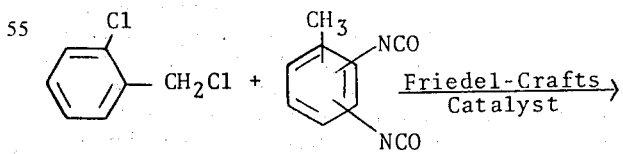

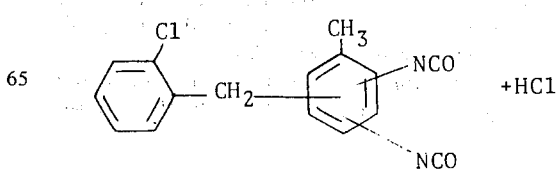

The dichlorophenyl methyldiisocyanatophenyl methane is similarly prepared by condensing toluene diisocyanate with a dichlorobenzyl chloride as illustrated by the following equation:

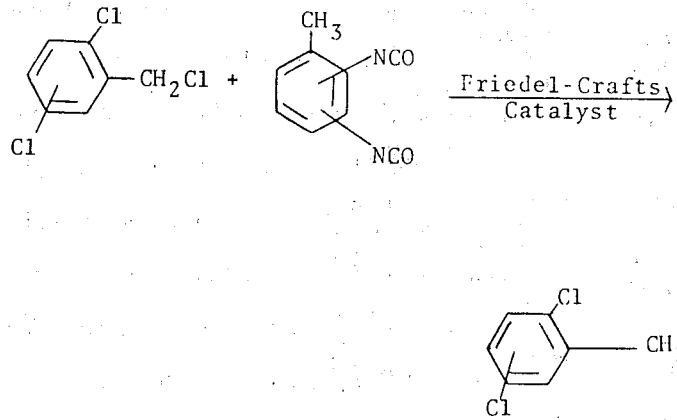

The above-illustrated reactions are carried out at a temperature within the range of 50°–250° C. and preferably using a large stoichiometric excess of the toluene diisocyanate. A more detailed description of the preparation of the chlorine-containing methylene-bridged diaryl diisocyanates is provided in U.S. Pat. No. 3,878,235, issued Apr. 15, 1975 to W. J. Schnabel and M. C. Raes, the entire disclosure of which is incorporated herein by reference.

The toluene diisocyanate reactant which is used to prepare the chlorine-containing diisocyanates can by any isomer or isomer mixture such as 2,4-toluene diisocyanate, 2,5-toluene diisocyanate, 2,6-toluene diisocyanate, 3,5toluene diisocyanate and mixtures of one or more of these isomers. The preferred toluene diisocyanate isomers are 2,4-toluene diisocyanate, 2,6-toluene diisocyanate, and mixtures of these two isomers. For reasons of economy and commercial availability, a mixture of about 80% by weight of the 2,4-isomer and about 20% by weight of the 2,6-isomer is particularly preferred.

The other reactant used to prepare the chlorine-containing diisocyanates is o-chlorobenzyl chloride or dichlorobenzyl chloride. The latter can be any isomer or mixture of isomers such as 2,3-dichlorobenzyl chloride, 2,4-dichlorobenzyl chloride, 2,5-dichlorobenzyl chloride and 2,6-dichlorobenzyl chloride.

In conducting the preparatory reactions described above, the crude chlorine-containing methylene-bridged diaryl diisocyanate products obtained may be directly used in the process of the present invention for producing flexible polyurethane foams. If desired, the crude product may preparatorily be purified, for example, by conventional distillation methods and the purified product employed. The added expense entailed in the purification step is not required, however, to prepare high load-bearing flexible polyurethane foams by the process of the present invention.

The other isocyanate reactant is an organic polymeric isocyanate which, in addition to the chlorine-containing methylene-bridged diisocyanates, provide the isocyanate component of the reaction mixture. Any suitable polymeric isocyanate composition may be employed in the process of the present invention. This includes mixtures comprising one or more such isocyanates. Illustrative polymeric isocyanates are described in U.S. Pat. No. 2,683,730, issued July 13, 1954 to Seeger et al., the entire disclosure of which is incorporated by reference herein.

Typical polymeric isocyanates are those having units of formula II as follows:

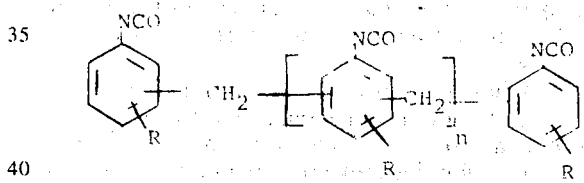

in which R is hydrogen and/or lower alkyl, e.g., methyl, ethyl, propyl and butyl, and $n$ has an average value of at least 2.1. The preferred polymeric isocyanates as defined by formula II are those in which $n$ is a number ranging in value from 2.1 to 4.0 and R is hydrogen and/or methyl.

Particularly preferred polymeric isocyanates are the polymethylene polyphenylisocyanates (i.e., those represented by formula II wherein R is hydrogen) which are available commercially under the trademark "PAPI." These are usually supplied in the form of a mixture of polyisocyanates having an average NCO functionability of 2.2–3.5, and more commonly about 2.3–3.0. It is to be understood that the term "organic polymeric isocyanate" as used in the specification and claims herein is intended to include mixtures containing one or more such polyisocyanates. Further details concerning the polymeric isocyanates and their preparation are provided in the above-noted Seeger et al. patent.

In a preferred embodiment, an organic polymeric isocyanate of low acidity is employed to prevent undesirable reactions with the catalyst or catalysts used.

Ratios of the chlorine-containing methylene-bridged diaryl diisocyanate to the organic polymeric isocyanate of any suitable proportions may be used to provide the isocyanate component. Generally, however, weight ratios of from about 50:50 to about 95:05 and preferably from about 60:40 to about 85:15 of chlorine-containing methylene-bridged diaryl diisocyanate to organic polymeric isocyanate may be used.

The polyether polyol component of the reaction mixture is one that is characterized by (1) a molecular weight of at least about 4,000, (2) a polyfunctional alcohol nucleus, (3) polyoxyalkylene chain segments attached through one end thereof to the nucleus, and (4) a ratio of primary to secondary hydroxyl end groups ranging from about 1.5:1 to about 5.5:1. This polyether can be prepared by methods generally well known in the art wherein a polyfunctional alcohol initiator is condensed, in the presence of an alkaline catalyst, first with an alkylene oxide having 3 or more carbon atoms and then with ethylene oxide.

The alcohol initiator which is used to prepare the polyether polyol can be any compound having 2–8 hydroxyl groups. Illustrative are ethylene glycol, propylene glycol, the butylene glycols such as 1,3-butylene glycol, the pentane diols such as 1,5-pentane diol, the hexane diols such as 1,6-hexane diol, glycerol, trimethylolpropane, sorbitol, pentaerythritol, methyl glucoside, sucrose, mixtures thereof and the like. It is preferred, however, to employ an aliphatic polyol having 2–4, and more preferably 3–4, hydroxyl groups, such as ethylene glycol, propylene glycol, glycerol, trimethylolpropane, sorbitol, and the like. The most preferred initiators are the aliphatic triols such as glycerol and trimethylolpropane.

In preparing the polyether polyol, a polyhydric alcohol initiator as described above is sequentially condensed, in the presence of an alkaline catalyst such as potassium hydroxide, first with an alkylene oxide having 3–8, and preferably 3–4, carbon atoms and then ethylene oxide. Illustrative of the alkylene oxides which are first condensed with the alcohol initiator are propylene oxide, butylene oxide, pentylene oxide, mixtures thereof and the like, propylene oxide being most preferred. In carrying out the sequential condensation reactions, such amounts of ethylene oxide and higher alkylene oxide are employed as to provide a polyether having a molecular weight of at least about 4,000, and preferably from about 4,500 to about 7,000, and in which polyether the ratio of primary to secondary hydroxyl groups is from about 1.5:1 to about 5.5:1 and preferably from about 2:1 to about 5:1.

In accordance with a particularly preferred embodiment of the invention, the polyether polyol which is employed in preparing the plyurethane foam is an oxypropylated, oxyethylated aliphatic triol having a molecular weight of about 4,500–7,000 and a ratio of primary to secondary hydroxyl groups from about 3:1 to about 4.5:1.

Such relative proportions of the polyol and the isocyanate components are used in the foam-forming reaction mixture as to provide at least 0.7 NCO group per hydroxyl group in the system, which includes the polyether polyol, as well as any additional material and/or foaming agent present in the system. In practice, such proportions of reactants are employed as to provide no more than about 1.25, and preferably about 0.9–1.15 NCO groups per each hydroxyl group.

Any suitable foaming agent, or mixture of foaming agents, may be employed in preparing the polyurethane foam. These include inorganic foaming agents, such as water, and organic foaming agents containing up to seven carbon atoms, such as the halogenated hydrocarbons and the low molecular weight alkanes, alkenes, and ethers. Illustrative organic foaming agents include monofluorotrichloromethane, dichlorofluoromethane, dichlorodifluoromethane, 1,1,2-trichloro-1,2,2-trifluoroethane, methylene chloride, chloroform, carbon tetrachloride, methane, ethane, ethylene, propylene, hexane, ethyl ether and diisopropyl ether. Water and the low molecular weight polyhalogenated alkanes, such as monofluorotrichloromethane and dichlorodifluoromethane, are preferred. The amount of foaming agent may be varied within a reasonably wide range as is well known in the art. Generally, however, the halogenated alkanes, for example, are employed in an amount of about 2–20 parts per 100 parts by weight of the polyether polyol; and water is employed in an amount of about 1–6 parts per 100 parts by weight of the polyether polyol.

The foams of the invention are prepared in the presence of a reaction catalyst. This may be any one of those known to be useful for this purpose, or mixtures thereof, including the tertiary amines and the metallic salts, particularly stannous salts. Typical tertiary amines include, for example, N-methyl morpholine, triethylene diamine and triethylamine. Typical metallic salts include, for example, dibutyltin dilaurate, stannous octoate and the like. The preferred catalysts are the tertiary amines such as triethylene diamine which may be purchased, as a ready-to-use composition, under the trademark Dabco 33–LV. Any suitable catalytic proportion of the catalyst may be employed, such as from about 0.05 to about 3.0, and preferably about 0.075–2.0 parts per every 100 parts of the polyether polyol reactant.

Minor amounts of a surfactant are employed in the preparation of the polyurethane foams of the present invention. Suitable surfactants include nonionic silicone compositions such as silicone oils (polydimethyl- or methylphenyl siloxanes) or block or graft co-polymers of polydimethyl siloxanes and polyalkylene oxides. U.S. Pat. No. 2,834,748 issued to Bailey and O'Connor and Plastic Foams by Frisch and Saunders (New York, M. Dekker, 1972) Part 1, pages 137 and 139 describe suitable silicone surfactants which are commercially available. Generally up to 2 parts of surfactant are employed per every 100 parts by weight of the polyether polyol.

If desired a curing agent, such as a conventional amine curing agent, may be included in the foam forming reaction mixture. However, in accordance with the invention, the use of curing agents is not necessary and therefore it is preferable to exclude such materials from the reaction mixture.

Various additives can also be employed to provide different properties in the polyurethane foam. Ingredients such as dyes may be added for color, and in addition, plasticizers, deodorants, antioxidants and flame retardants may be incorporated, if desired.

In the practice of this invention, a polyurethane foam-forming reaction mixture comprising the above-described ingredients is fed to a suitable reaction zone such as by pouring into a suitable mold or onto a moving conveyor belt where reaction proceeds. The foaming reaction is exothermic, and auxiliary heat is usually not necessary to effect the reaction, although it may be employed. After the reactants have been admixed for a period of between about 0.1 and about 20 seconds, an emulsion or "cream" forms. As the temperature increases from the reaction, gas bubbles are generated bringing about the formation of an uncured cellular gel material which usually cures fairly rapidly at room temperature. Once cured, the foam will be ready for use in various applications, such as seating, bedding, cushioning, etc.

Polyurethane foams prepared according to the process of the invention lend themselves to easy and fast processing by virtue of the fact that they become tack-free within a relatively short period of time after completion of the foaming reaction. These foams also have improved permeability inasmuch as they are substantially open-celled, i.e., more than 50 percent of their cells are open cells.

Furthermore, these foams are characterized by a combination of desirable properties. The foams have a range in density of from about 2.0 to about 3.8, and preferably from about 2.3 to about 3.2 pounds per cubic foot. High load-bearing properties are indicated by results obtained in determining compression load deflection ratings in accordance with the test described in ASTM D-1564-64T. To qualify as a high load-bearing foam, the load required to produce a 25 percent compression load deflection over the entire top area of the foam is in excess of 40 lbs. per square inch. At 65 percent compression load deflection the required load is in excess of 90 lbs. per square inch of foam surface. The foams of the present invention have a SAC factor generally in excess of 2.4. The "SAC factor" is a measure of support provided by a cushioning material. In accordance with the test described in ASTM D-1564-64T, it is expressed as the ratio of compression load deflection at 65 percent to 25 percent deflection. Thus by having a SAC factor of over 2.4, the foams of the invention, while being quite flexible and soft at the surface, exhibit little or no tendency to bottom out; and this property is achieved in the foams of the invention in the absence of fillers or cross-linking agents which might alter the basic properties of the foam. The foams of the invention are also high strength foams as characterized by good tear strength, tensile strength and elongation properties.

By virtue of the combination of desirable physical properties characterizing the polyurethane foams of the invention, these foams meet the rigid requirement set by the automotive industry for making molded auto seats. They are also of utility in numerous other cushioning applications such as in the manufacture of padding, seat cushions and the like.

The following examples are provided to illustrate the invention.

EXAMPLE 1

A flexible polyurethane foam was prepared from the following ingredients in the indicated proportion.

| Ingredients | Parts by Weight |
| --- | --- |
| Polyether polyol A (1) | 75.0 |
| Polyether polyol B (2) | 25.0 |
| Water | 3.0 |
| o-Chlorophenyl methyl diisocyanatophenyl methane | 48.8 |
| Organic polymeric isocyanate (3) | 12.2 |
| Triethylene diamine catalyst composition (4) | 0.9 |

| Ingredients | Parts by Weight |
| --- | --- |
| Polydimethyl siloxane surfactant (5) | 0.06 |

(1) This is a 4,625 molecular weight polyether triol prepared by the KOH catalyzed oxyalkylation of glycerol first with about 65 moles of propylene oxide and then with about 15 moles of ethylene oxide.
(2) A polyether triol having a molecular weight of 5,340 prepared by the KOH catalyzed oxyalkylation of glycerol first with about 80 moles of propylene oxide and then with about 15 moles of ethylene oxide.
(3) A polymethylene polyphenyl isocyanate available commercially under the trademark "PAPI 135". This organic polymeric isocyanate has an average functionability of about 2.7 and an acidity of 0.05 percent as HCl.
(4) This catalyst composition, purchased commercially under the trademark "Dabco 33LV", consists essentially of about ⅓ part of triethylene diamine and about ⅔ part of dipropylene glycol by weight.
(5) This surfactant was purchased commercially under the trademark "Dow Corning 200 Fluids" (5 centistokes viscosity at 25° C).

The above ingredients were mixed together and dispensed from a foaming machine into a square cardboard box. The foaming reaction took place instantly and was completed in less than 3 minutes. A uniform foam product was thus obtained which cured at room temperaure for at least 48 hours without exhibiting any shrinkage or collapse. After measuring the core density of the foam, its physical properties were determined, namely, compression load deflection properities at 25 and 65% deflection and SAC factor (as described above, per ASTM D-1564-64T), tensile strength, tear strength and elongation. The latter three properties were determined in accordance with the test described in ASTM 1564-64T. The tensile strength, expressed in pounds per square inch, is a measure of the minimum tension per unit cross-sectional area, which must be exerted on a standard foam sample to cause it to snap or break. The tear strength is expressed in pounds per linear inch, and this indicates the force necessary to cause a one-inch tear in a standard foam sample. Finally the elongation, which is expressed as a percentage of original length of the sample, is a measure of the length that the sample can be stretched to before it breaks or snaps. The results of all these determinations are provided in Table 1 below.

EXAMPLE 2

Using the procedure of Example 1, a flexible polyurethane foam was prepared from the following ingredients in the indicated proportions:

| Ingredients | Parts by Weight |
| --- | --- |
| Polyether polyol (6) | 500.0 |
| Water | 15.0 |
| Chlorine-containing methylene bridged diaryl isocyanate (7) | 251 |
| Organic polymeric isocyanate (per Example 1) | 63 |
| Triethylene diamine catalyst composition (per Example 1) | 7.5 |
| Stannous octoate catalyst | 1.5 |
| Polydimethyl siloxane surfactant (per Example 1) | 0.3 |

(6) A polyether polyol having a molecular weight of 6,500 prepared by the KOH catalyzed oxyalkylation of glycerol first with about 100 moles of propylene oxide and capped with about 12.5 moles of ethylene oxide.
(7) This is a crude reaction product containing about 80 percent by weight of o-chlorophenyl methyl diisocyanatophenyl methane.

The above ingredients were hand mixed at room temperature and immediately poured into a cake box at room temperature. The foaming reaction took place immediately and foaming was complete within 3 minutes. Curing of the foam was accomplished in an oven at 100° C for a period of 3 hours. The foam was tested using the identical procedure described in Example 1. Testing results are provided in Table 1 below.

EXAMPLE 3

The identical procedure of Example 2 was followed except that 216 parts of the crude o-chlorophenyl methyl diisocyanatophenyl methane product were used with 92.5 parts of the organic polymeric isocyanate. Foam testing results are reported in Table 1 below.

Table 1

| FOAM PHYSICAL PROPERTIES | | | |
|---|---|---|---|
| | Ex. 1(a) | Ex. 2(a) | Ex. 3(b) |
| Density (lbs./cu. ft.) | 3.1 | 2.6 | 2.4 |
| Compression Deflection Properties (lbs.) | | | |
| at 25% deflection | 42.5 | 48.3 | 42.9 |
| at 65% deflection | 125.8 | 118.2 | 102.3 |
| SAC Factor | 2.95 | 2.5 | 2.4 |
| Tensile Strength (lbs./sq. in.) | 17.8 | 15.5 | 15.7 |
| Tear Strength (lbs./linear in.) | 3.7 | 3.0 | 2.6 |
| Elongation (%) | 270 | 220 | 220 |

(a) Weight ratio of o-chlorophenyl methyl diisocyanatophenyl methane to organic polymeric isocyanate 80:20.
(b) Weight ratio of o-chlorophenyl methyl diisocyanatophenyl methane to organic polymeric isocyanate 70:30.

Examples 1 through 3 show that polyurethane foams having high load bearing, high strength properties are obtained by employing the novel mixture of the present invention of a chlorine-containing methylene bridged diaryl diisocyanate with an organic polymeric isocyanate.

What is claimed is:

1. In a process for preparing high load-bearing, high strength flexible polyurethane foam from a reaction mixture comprised of an organic polymeric isocyanate, a polyether polyol reactant characterized by (1) a molecular weight of at least about 4,000, (2) an aliphatic nucleus having from about 2 to about 8 hydroxyl groups, (3) polyoxyalkylene chain segments attached to said nucleus, and (4) a ratio of primary to secondary hydroxyl end groups ranging from about 1.5:1 to about 5.5:1, a foaming agent, a reaction catalyst, and a surfactant, the improvement which comprises including in said reaction mixture a chlorine-containing methylene-bridged isocyanate of the formula:

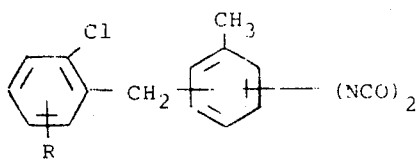

wherein R is H or Cl, and wherein the weight ratio of said chlorine-containing methylene-bridged diaryl diisocyanate to said organic polymeric isocyanate is from about 50:50 to about 95:5.

2. A polyurethane foam prepared by the process of claim 1.

3. The process of claim 1 wherein said polyether polyol has a molecular weight of from about 4,500 to about 7,000 and in which said ratio of primary to secondary hydroxyl end groups ranges from about 2:1 to about 5:1.

4. The process of claim 3 wherein said organic polymeric isocyanate is a compound having the following formula:

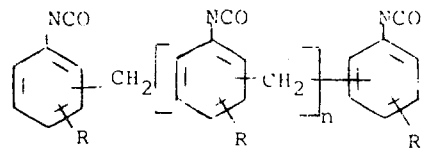

wherein R is methyl or hydrogen, and $n$ is a member from about 2.1 to about 4.0.

5. A polyurethane foam prepared by the process of claim 4.

6. The process of claim 4 wherein said formula I, R is H.

7. The process of claim 6 wherein said chlorine-containing methylene-bridged diaryl diisocyanate is selected from the group consisting of:
2-chlorophenyl-3'-methyl-4',6'-diisocyanatophenylmethane
2-chlorophenyl-2'-methyl-3',5'-diisocyanatophenylmethane
2-chlorophenyl-3'-methyl-2',4'-diisocyanatophenylmethane
2-chlorophenyl-4'-methyl-3',5'-diisocyanatophenylmethane and mixtures thereof.

8. The process of claim 7 wherein said surfactant is a silicone surfactant.

9. A polyurethane foam of the process of claim 8.

10. The process of claim 8 wherein said polyether polyol is an oxypropylated, oxyethylated aliphatic triol having a molecular weight of from about 4,500 to about 7,000 and in which said ratio of primary to secondary hydroxyl end groups ranges from about 3:1 to about 4.5:1.

11. The process of claim 10 wherein said aliphatic triol is glycerol or trimethylolpropane.

12. The process of claim 11 wherein said reaction catalyst is a mixture of about ⅓ parts triethylene diamine and about ⅔ parts of dipropylene glycol by weight.

13. A polyurethane foam produced by the process of claim 12.

14. The process of claim 11 wherein said reaction catalyst is stannous octoate.

15. The process of claim 3 wherein said organic polymeric isocyanate is a polymethylene polyphenylisocyanate having an average NCO functionality of 2.2–3.5.

16. The process of claim 15 wherein said weight ratio of said chlorine-containing methylene-bridged diaryl diisocyanate to said organic polymeric isocyanate is from about 60:40 to about 85:15.

17. A polyurethane foam prepared by the process of claim 15.

* * * * *